United States Patent
Luo et al.

(10) Patent No.: US 7,428,551 B2
(45) Date of Patent: Sep. 23, 2008

(54) "GIRD PLUS T TREE" INDEX METHOD FOR QUICK ORIENTATION IN MASSIVE MEMORY DATABASE

(75) Inventors: Yibing Luo, Nanjing (CN); Sheng Yuan, Nanjing (CN); Xingyu Zhu, Nanjing (CN); Quan Liu, Nanjing (CN); Kaiyu Gu, Nanjing (CN)

(73) Assignee: Linkage Technology Co., Ltd., Nanjing (CN)

( * ) Notice: Subject to any disclaimer, the term of this patent is extended or adjusted under 35 U.S.C. 154(b) by 296 days.

(21) Appl. No.: 11/380,481

(22) Filed: Apr. 27, 2006

(65) Prior Publication Data
US 2007/0198568 A1   Aug. 23, 2007

(30) Foreign Application Priority Data
Feb. 20, 2006   (CN) .................. 2006 1 0038378

(51) Int. Cl.
*G06F 17/00* (2006.01)
*G06F 7/00* (2006.01)
(52) U.S. Cl. ...................... 707/102; 707/101
(58) Field of Classification Search ........... 707/102, 707/200, 203, 100, 204, 3; 382/240
See application file for complete search history.

(56) References Cited

U.S. PATENT DOCUMENTS

| | | | | |
|---|---|---|---|---|
| 6,122,645 A * | 9/2000 | Bohannon et al. | ........... | 707/203 |
| 6,144,773 A * | 11/2000 | Kolarov et al. | ........... | 382/240 |
| 7,293,028 B2 * | 11/2007 | Cha et al. | .............. | 707/100 |
| 2003/0033328 A1 * | 2/2003 | Cha et al. | .............. | 707/204 |
| 2004/0107186 A1 * | 6/2004 | Najork et al. | ............. | 707/3 |
| 2004/0220972 A1 * | 11/2004 | Bhattacharjee et al. | ..... | 707/200 |

OTHER PUBLICATIONS

"T-Tree : A main Memory database Index Structure for Real Time Applications", Kong-Rim Choi et al., 1996, IEEE.*
"The X-tree: an Index Structure for High Dimensional Data", Stefan Berchtold et al., Proceedings of the 22nd VLDB Conference Mumbai (bombay), India, 1996.*

* cited by examiner

*Primary Examiner*—Hung T Vy
(74) *Attorney, Agent, or Firm*—Global IP Services; Tianhua Gu

(57) ABSTRACT

"Grid Plus T Tree" multidimensional index method in memory database partitions the whole record sets to different grid cells. Every grid data unit is connected with one data barrel, which loads records, through the grid directory. Every data unit is only mapped with one data barrel. For memory database, setting up a "T Tree" with these data units according to one field, so as to set up one "T Tree" for each data barrel according to one field. Then the grid directory can be presented by a k-dimensional (the dimension of keyword) array. The field ranges of these data units are called scale. Scale is the memory range of each "T Tree". This invention successfully overcomes the shortcomings that the current index methods for memory database neither efficiently use the memory space nor suits multi-dimension. T Tree is much more efficient than K-D Tree or R Tree in using the memory space, and it has one more one-dimensional data structure during the process of grid partition, which can help store one field of the keyword as the index.

8 Claims, 3 Drawing Sheets

"GIRD PLUS T TREE" INDEX METHOD FOR QUICK ORIENTATION IN MASSIVE MEMORY DATABASE

CROSS REFERENCE TO RELATED PATENT APPLICATION

This patent application claims the priority benefit of the Chinese patent application No. 200610038378.6 filed on Feb. 20, 2006.

BACKGROUND OF THE INVENTION

1. Field of the Invention

This invention deals with the method to set up multidimensional index in the database system of memory database, especially the implementing method of "Grid+T Tree" technology in memory database.

2. Description of the Related Art

Generally millions of records of data need to be processed in the telecommunications business supporting system, while the limited host computers' resources, like CPU and memory, are very valuable. Thus for the research on memory database technology, it comes to be an important and difficult point to complete relevant database operations with the least resources and highest efficiency. Adopting a good index structure is one effective approach to assure the efficiency of memory database operations.

During the past many years research on index structure, tree structure is always one of the effective methods to set up multidimensional index for database system. Among all these multidimensional index structures, "K-D Tree", "R Tree" and "T Tree" are the most popular ones.

1.1 "K-D Tree"

"K-D Tree" is a binary search tree for a k-dimensional space. It mainly stores node data. Within every internal node, it divides the k-dimensional space, which is represented by the node, into two sectors, by one (k−1)-dimensional hypersurface. These hypersurfaces emerge alternately on k possible directions, and each hypersurface should include at least one node data. FIG. 1 is a sample of "K-D Tree".

From the perspective of operations, search or insertion on a "K-D Tree" is very simple, while the deletion is somewhat complicated, since deleting one node may cause the rebuilding of its subtrees. Since "K-D Tree" can only process node data, it can only use their central point instead for other formed data. The points need to be emphasised are when the data is inserted in different order, the structure of the "K-D Tree" will also be different, and the data may emerge at any places of the tree dispersedly, other than only emerge at the leaf nodes.

From the introduction above, it can be seen that "K-D Tree" is a multidimensional binary tree structure. So it has very good index efficiency for classical database system based on disks. But because each node only has one data node and two pointers of its left and right children, the storage efficiency seems to be too low to memory database, whose memory space is extremely valuable.

1.2 "R Tree"

"R Tree" is a multidimensional index structure similar to "B+ Tree". Each of its internal nodes stores not the data, but the Minimum Bounding Rectangle (MBR) of all sub-nodes. The actual data is stored within the leaf nodes, and all the leaf nodes are shown at the same level, which can be seen from FIG. 2.

The search operation traverses the tree to find all leaf nodes of which the MBRs overlap the query rectangle. On insertion of a new entry, the R-tree finds the leaf node that needs the least area enlargement of its MBR in order to contain the MBR of the new node. The deletion begins from one exact search. If the node is found, it will be deleted, and the MBR of its ancestor nodes will be modified successively.

From the introduction above, it can be seen that since the structure of "R Tree" is similar to "B+ Tree", thus it satisfied the requirement of less disk access and faster search speed. While because all the data is stored at the leaf nodes, and the internal nodes only store the relevant information of sub-nodes, so "R Tree" wastes a lot of memory space.

1.3 "AVL Tree"

An "AVL Tree" is the first-invented self-balancing binary search tree. In an "AVL Tree" the heights of the two child subtrees of any node differ by at most one, therefore it is also known as height-balanced. Search, insertion, and deletion are all O (log n) in both the average and worst cases. Additions and deletions may require the tree to be rebalanced by one or more tree rotations.

1.4 T Tree

Similar to "AVL Tree", the minus between left and right sub-trees' height will not exceed 1. Different from "AVL Tree", "T Tree" can store several key values within one storage node. Its leftmost and rightmost keys are respectively the minimum and maximum key values of this node. Its left sub-tree only contains those records with smaller key value, and the right sub-tree only contains those records with larger key value. FIG. 3 is a structure chart of "T Tree".

From the structure of "T Tree", it can be seen that "T Tree" has the same time complexity O (Log2N) as what "K-D Tree" and "R Tree" have. The largest difference is that each node of "T Tree" includes multiple keys, and only the pointers of left and right sub-node contain extra additional information, which improves the efficiency of the nodes.

The balance process of "T Tree" is similar to the one of "AVL Tree". They are all implemented by four operations: single left rotation (LL); double left rotation (LR); single right rotation (RL); double right rotation (RR). The only difference is that the LR or RL operation of "T Tree" may change a leaf node into an internal node with only one elementary. Thus, one elementary of its child node needs to be moved to this node, to assure it remains one "T Tree". The balance factor of nodes of "AVL Tree" is the result of its right child tree's height minus its left child tree's height. When the balance factor is 1, 0, or −1, it is regarded as balanced. When the balance factor is 2 or −2, the tree is regarded as not balanced, and needs to be rebalanced. The balance factor can be stored within every node directly, or can be calculated by the heights of child trees stored in the node.

The recursion arithmetic of inserting a new data element, "e", into a balanced binary sort tree (BBST) can be described as follows:

1. If the BBST is an empty tree, then a new node with its data element "e" is inserted as the root node of BBST, and the height of the tree is increased by 1;
2. If the keyword of "e" is equal to the keyword of the root node of BBST, the operation will not go along.
3. If the keyword of "e" is less than the keyword of the root node of BBST, and the keyword of every node of BBST's left child tree is not equal to the keyword of "e", then "e" can be inserted to BBST's left child tree. After insertion, the height of left child tree should be increased by 1, and there are different follow-up operations according to different situations:

a. If the balance factor of BBST's root node is −1 (the height of right child tree is larger than the height of left child tree), then modify the balance factor of the root node into 0, and the height of BBST remains changed;
b. If the balance factor of BBST's root node is 0 (the height of right child tree is equal to the height of left child tree), then modify the balance factor of the root node to 1, and the height of BBST should be increased by 1;
c. If the balance factor of BBST's root node is 1 (the height of left child tree is larger than the height of right child tree) and if the balance factor of the root node of BBST's left child tree is 1, then it needs the single right rotation. After the rotation, the balance factors of the root node and the root node of right child tree should be changed to 0, and the height of BBST remains changed.
4. If the keyword of "e" is larger than the keyword of BBST's root node, and the keyword of every node of BBST's right child tree is not equal to the keyword of "e", then "e" can be inserted to BBST's right child tree. After insertion, the height of right child tree should be increased by 1, and there are different follow-up operations according to different situations "T Tree" can be regarded as a high efficient memory data structure of MMDB. "T Tree" is an "AVL Tree" based on Adel'son Vel'skii and Landis.11. Same as "AVL Tree", the difference of heights between left child tree and right child tree of "T Tree" may be 1 in most situations.

"T Tree" is much more efficient than "K-D Tree" or "R Tree" in using memory space, but it still has its shortcomings. In the situation of one-dimensional index, "T Tree" has very good search effect on both exact search and range search, but in the situation of multidimensional index, its shortcomings is obvious that it can only use one field of the keyword as the index. For example, the keyword of some table consists of three fields, <key1, key2, key3>. Assuming that setting up a "T Tree" by using the value of key1 as the index, if at some time the record set in the memory is constructed by all possible combinations of C=f {<i,j,k>, 0<i<10000; 0<j<1000; 0<k<100}, which contains 1 billion records, then it needs to compare at least 1 million records during search. Such search efficiency is too low.

From the analysis above, among all these multidimensional index structures, "K-D Tree" and "R Tree" have the shortcomings of wasting memory for memory database, whose memory space is very valuable. Although "T Tree" has its advantages of fast memory access and saving memory space, its efficiency is still not high for multidimensional index.

SUMMARY OF THE INVENTION

Purpose of the Invention

The purpose of this invention is to announce the "Grid+T Tree" multidimensional index method for memory database, which has higher efficiency and less storage, compared with the classical multidimensional index structures currently used by memory database; to announce the implementation of "Grid+T Tree" multidimensional index method; and to overcome the shortcomings of current multidimensional index methods for memory database.

Technical Solution

The technical solution of this invention is: by using "Grid+T Tree" multidimensional index method in memory database, the whole record sets will be partitioned to different grid cells. Every grid data unit is connected with one data barrel, which loads records, through the grid directory. Every data unit is only mapped with one data barrel. For memory database, setting up a "T Tree" with these data units according to one field, so as to set up one "T Tree" for each data barrel according to one field. Then the grid directory can be presented by a k-dimensional (the dimension of keyword) array. The field ranges of these data units are called scale. Scale is the memory range of each "T Tree".

The improvement of this "Grid+T Tree" multidimensional index methods for memory database is: the data units can be dynamically distributed in the memory database constructed by "Grid+T Tree". The dynamical distribution means these data units are stored in the memory spaces, which are previously partitioned during the initialisation of the memory database, and the data units can be dynamically used or released according to the requirements of the program.

For the disk database, generally one data barrel is mapped with one disk page. The memory space occupied consists of the array space for setting up grid and the space for setting up "T Tree". Assuming there is a k-dimensional index, <I1, I2 ... Ik>, equably divided its value scope into P1, P2 ... Pk parts representatively by scale.

Characteristics of the Invention

This invention successfully overcomes the shortcomings that the current index methods for memory database neither efficiently use the memory space nor suits multi-dimension. Thus it makes the memory database technology able to be widely used in the telecommunications operation supporting system. T Tree is much more efficient than K-D Tree or R Tree in using the memory space, and it has good search effect for both exact search and range search when doing one-dimensional index. For Grid Tree, there must be one more one-dimensional data structure during the process of grid partition, which can help store one field of the keyword as the index.

DETAILED DESCRIPTION OF THE INVENTION

Figure 1:
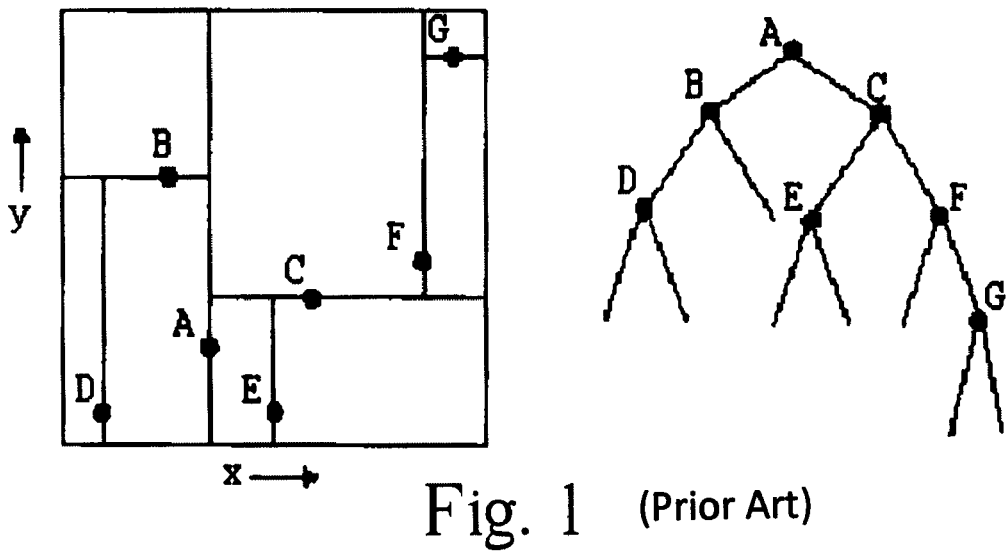
FIG. 1 shows the structure chart of an existing technology, "K-D Tree"
Figure 2:
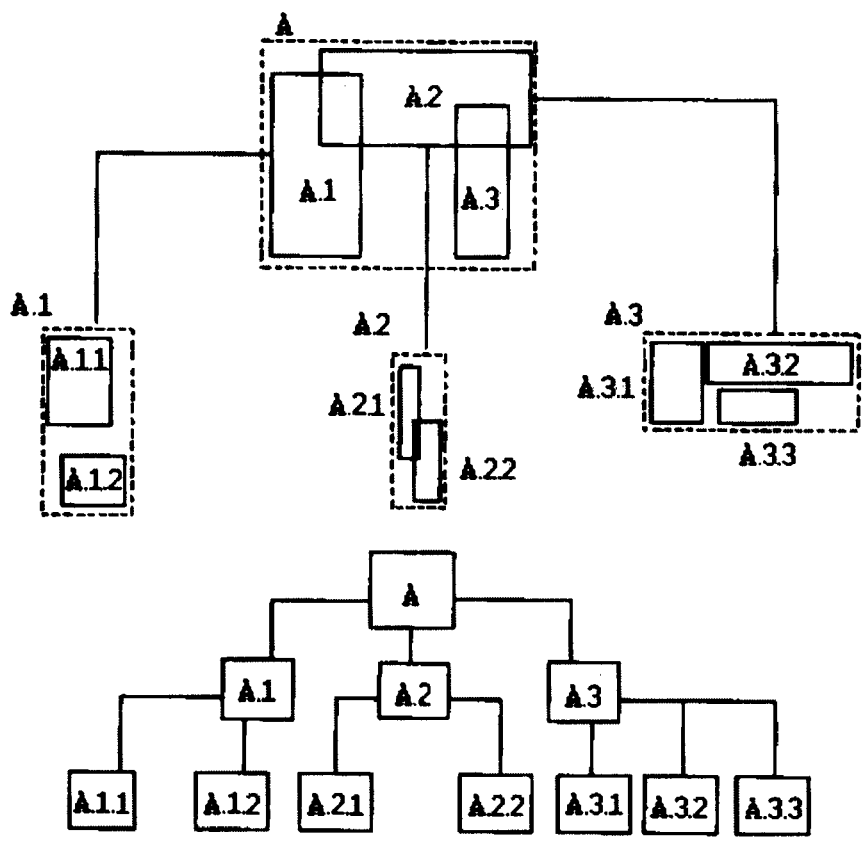
FIG. 2 shows the structure chart of an existing technology, "R Tree"
Figure 3:
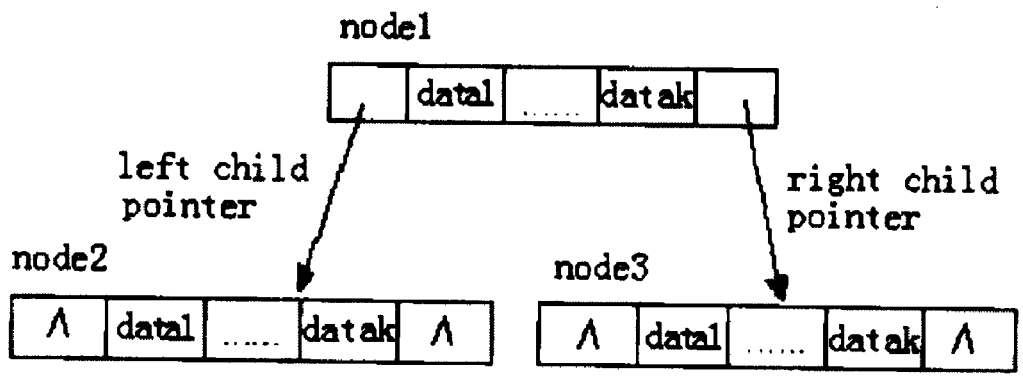
FIG. 3 shows the structure chart of an existing technology, "T Tree"
Figure 4:
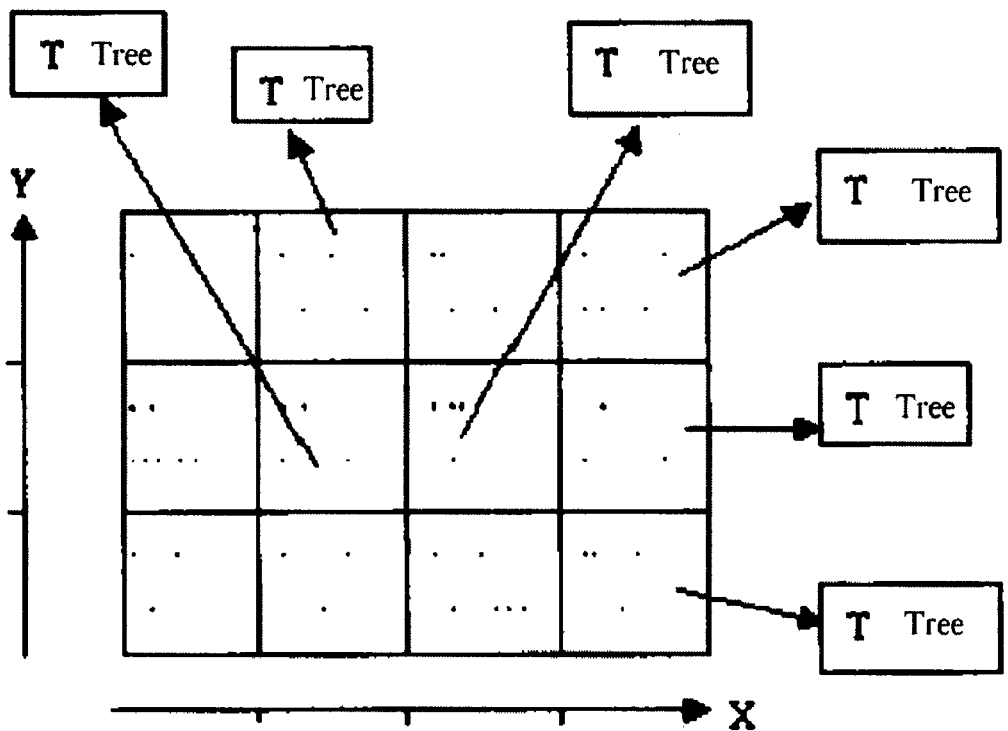
FIG. 4 shows the structure chart of this invention, "Grid+T Tree"

As shown in FIG. 1 and FIG. 4, "Grid+T Tree" multidimensional index method is evolved from the grid file, an index method for classical disk database. It is a typical access method base on Hash.

FIG. 4 is the structure chart of "Grid+T Tree". As shown in the chart, the whole record sets are partitioned to different grid cells according to some field. Every grid cell is connected with one data barrel, which loads records, through the grid directory. Every cell is only mapped with one barrel. For disk database, normally one data barrel is mapped to one disk page of the hard disk. For memory database, these data units are built to one "T Tree" according to some field, so as to make the size of every barrel dynamically distributable. In memory database, the grid directory is normally presented by one k-dimensional (the dimension of keyword) array. The field range of these data units is called scale.

The search, insertion and deletion of "Grid+T Tree" structure are similar to each other. Their arithmetic will be explained through the sample of search operation as follows.

Search Operation:

The search operation of the "Grid+T Tree" structure is very simple. When doing exact search, first use the scale to locate the grid where the destination record is, then find the "T Tree" to be searched by grid directory, and search by the method of search operation on a "T Tree", which has been introduced above.

Figure 5:
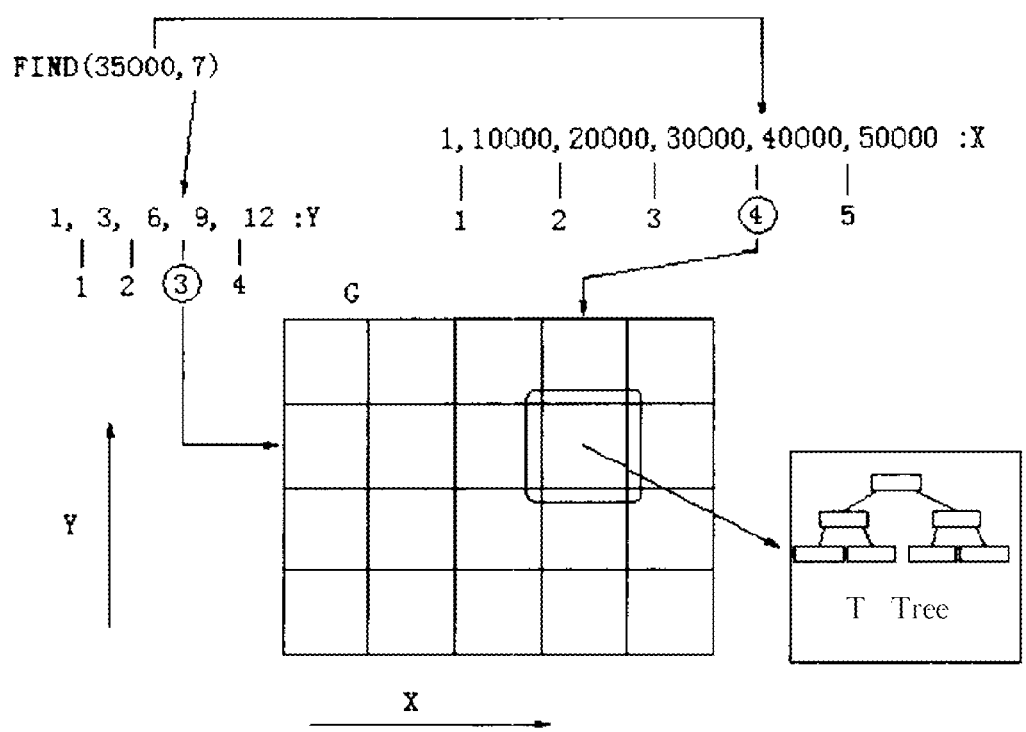
FIG. 5 shows the structure search chart of this invention, "Grid+T Tree"

For example as below, userid—user identity; prcplnid—tariff identity; if the keyword of some database consists of two field <userid, prcplnid>, among which the value scope of userid is from 1 to 50000, and the value scope of prcplnid is from 1 to 12, the scale of the grid is partitioned as X(userid)=(1, 10000, 20000, 30000, 40000, 50000); Y(prcplnid)=(1, 3, 6, 9, 12), then the chart of exact search operation, FIND (35000, 7), is shown as FIG. 5.

The scale of field value 35000 on axis X is X(4), the scale of field value 7 on axis Y is Y(3), so the address pointed by two-dimensional array G(4,3) is the root address of "T Tree" where the destination record located. For range search, first find the scale value of each field of the keyword, then the grid cell, mapped by the crossing of these scale values, is the set of "T Tree"s to be searched.

The Principle of Grid Partition (Higher Efficiency)

The principle of grid partition is to partition the key values with as less value scope as possible. If it is possible, partition it to 1, and make the larger key value as the index of "T Tree". This can reduce the dimension of the keyword, make it least possible to have same key values in one area, and finally lessen the time of comparison during search greatly. The worst situation is that all the N records are partitioned to one grid, then there is only one "T Tree" constructed in the memory, and the time complexity is O ($log_2 N$); the normal situation is all the records are equably partitioned to every grid, then the record number of each grid is $N/(P1*P2* \ldots *Pk)$, and the time complexity is O ($log_2(N/(P1*P2* \ldots *Pk))$).

For example, to partition the grid of the record set constituted by all the possible combination of C={<l, j, k>, 0<i<10000; 0<j<1000; 0<k<100} in the sample above, still using key1 as the index of "T Tree", partition the record to 1000 area by three different partition methods, respectively A=(1000, 1, 1); B=(10, 10, 10); C=(1, 10, 100). Then after partition the time of comparison for some determined keyword are 100000, 1000, 100 respectively. The "Grid+T Tree" is a middle solution between building a giant "T Tree" and index directly by multidimensional array. It finds out a balanced point on both time and space, which not only saves the search time, but also saves the memory space.

Space Complexity (Smaller Storage)

The memory space occupied is constituted by the array space for grid and the space for building "T Tree". Assume there is a k-dimensional index <I1, I2 . . . Ik>, their value scope are equably and respectively divided to P1, P2 . . . Pk parts by scale, then the memory space used to build grid is $M1=C*P1*P2* \ldots *Pk$, within which C is the number of bytes for one address. If the operation system is of 32 bits, then C=4. In the nodes of "T Tree", the record address is stored, instead of storing the keywords. The memory space is saved by adding one more time of memory access. Since within the nodes of "T Tree", the space occupied by data item is much larger than the space occupied by the pointers pointing to the left and right child nodes, the space concerned here is only that of data item, thus $M2=C*N$, within which, C is the same definition as above, and N is the number of record.

So the total memory space occupied is $M=M1+M2=C*(P1*P2* \ldots *Pk+N)$.

The search operation will be used as a sample to explain the implementation effectiveness as follows:

userid (15 bits)—user identity prcplnid (8 bits)—tariff identity

Assuming the keyword of some database is constituted by two field <userid, prcplnid>, among which the value scope of userid is from 1 to 50000, and the value scope of prcplnid is from 1 to 12, and there are all together 1 million records in the memory database, the result of implementing search operation of the index is shown as below:

| Index type | Memory size (megabytes) | Efficiency (seconds) |
|---|---|---|
| "K-D Tree" | 36 M | 5.12 |
| "R Tree" | 40 M | 4.33 |
| T tree | 50 M | 3.32 |
| "Grid + T Tree" | 26 M | 3.31 |

From the actual result of implementation, "Grid+T Tree" method contains both less memory spending and higher implementing efficiency.

What is claimed is:

1. A grid plus T-Tree method to setup a multidimensional index for a memory database comprising the steps of:
partitioning whole record sets to different grid data units;
connecting every said grid data unit with one data barrel, which loads records, through a grid directory, every said grid data unit is only mapped with one data barrel;
setting up a T-Tree with said grid data units according to one field from memory database, so as to set up one T-Tree for each said data barrel according to one field;
presenting a grid directory by a k-dimensional array, where k is the dimension of the keyword array, the field ranges of said grid data units are called scale, said scale is the memory range of each said T-Tree.

2. The Grid Plus T-Tree method to set up multidimensional index for memory database of claim 1, wherein said grid data unit is dynamically distributed in a memory database constituted by the dynamical distribution means said grid data units are stored in a memory space, which are previously partitioned during a initialization of the memory database, and is dynamically used or released according to requirements of a program.

3. The Grid Plus T-Tree method to setup multidimensional index for memory database of claim 1, wherein for a disk database, generally one said data barrel is mapped with one disk page, a memory space occupied includes a space of array for setting up grid and building said T-Tree, if there is a k-dimensional index, <I1, I2 . . . Ik>, equably dividing its value scope into P1, P2 . . . Pk parts representatively by said scale, wherein I is each array of the k-dimensional array from I1 to Ik, P1, P2 . . . Pk is a value scope of each array.

4. The Grid Plus T-Tree method to setup multidimensional index for memory database of claim 1, wherein partition value scope during partitioning said grid is a smaller key value, if it can be partitioned to 1, the larger scope shall be used as the index to set up said T-Tree.

5. The Grid Plus T-Tree method to setup multidimensional index for memory database of claim 1, wherein all N records are partitioned to one grid, then there is only one T-Tree constructed in a memory space, and the time complexity is 0 (log2N); the normal situation is all the records are equably partitioned to every grid, then the record number of each grid is N/(P1*P2* . . . *Pk), and the time complexity is 0 (log2(N/(P1*P2* . . . *Pk))), wherein 0 is time complexity, N is the records in each grid.

6. The Grid Plus T-Tree method to setup multidimensional index for memory database of claim 1, wherein a memory space occupied consists of the array space for setting up grid and the space for setting up T-Tree.

7. The Grid Plus T-Tree method to setup multidimensional index for memory database of claim 1, wherein assuming there is a k-dimensional index <I1, I2 . . . Ik>, said their value scope are equably and respectively divided to P1, P2 . . . Pk parts by scale, then a memory space used to build grid is M1=C*P1*P2* . . . *Pk, within which C is the number of bytes for one address, if the operation system is of 32 bits, then C=4.

8. The Grid Plus T-Tree method to setup multidimensional index for memory database of claim 1, wherein in nodes of the T-Tree record addressees are stored to instead of storing keywords, thereby a memory space is saved.

* * * * *

UNITED STATES PATENT AND TRADEMARK OFFICE
CERTIFICATE OF CORRECTION

PATENT NO. : 7,428,551 B2  
APPLICATION NO. : 11/380481  
DATED : September 23, 2008  
INVENTOR(S) : Yibing Luo Page 1 of 1

It is certified that error appears in the above-identified patent and that said Letters Patent is hereby corrected as shown below:

Title Page, Item (54) Title: should read,
--(54) "Grid Plus T Tree" Index Method for Quick Orientation in Massive Memory Database--.

Signed and Sealed this

Ninth Day of February, 2010

David J. Kappos  
*Director of the United States Patent and Trademark Office*

UNITED STATES PATENT AND TRADEMARK OFFICE
CERTIFICATE OF CORRECTION

PATENT NO. : 7,428,551 B2
APPLICATION NO. : 11/380481
DATED : September 23, 2008
INVENTOR(S) : Yibing Luo It is certified that error appears in the above-identified patent and that said Letters Patent is hereby corrected as shown below:

Title Page, Item (54) and at Column 1, lines 1-3, Title: should read,
--"Grid Plus T Tree" Index Method for Quick Orientation in Massive Memory Database--.

This certificate supersedes the Certificate of Correction issued February 9, 2010.

Signed and Sealed this

Ninth Day of March, 2010

David J. Kappos
*Director of the United States Patent and Trademark Office*